United States Patent [19]
Krueger

[11] Patent Number: 5,983,599
[45] Date of Patent: Nov. 16, 1999

[54] OFFSET ROTARY ANVILS FOR APPLYING FITMENTS TO CARTON

[75] Inventor: David Krueger, Grantsburg, Wis.

[73] Assignee: Tetra Laval Holdings & Finance, S.A., Pully, Switzerland

[21] Appl. No.: 09/065,312

[22] Filed: Apr. 23, 1998

[51] Int. Cl.⁶ .................................................. B65B 61/18
[52] U.S. Cl. ........................... 53/410; 53/412; 53/133.2; 53/133.4; 493/87; 493/213
[58] Field of Search .............................. 156/69; 493/213, 493/87, 214, 102; 53/410, 412, 133.1, 133.2, 133.3, 133.4

[56] References Cited

U.S. PATENT DOCUMENTS

| | | |
|---|---|---|
| 4,437,985 | 3/1984 | Hinds et al. . |
| 4,788,811 | 12/1988 | Kawajiri et al. ...................... 493/87 X |
| 5,058,360 | 10/1991 | Yamazaki et al. ...................... 53/133.2 |
| 5,125,886 | 6/1992 | Dirksing . |
| 5,219,320 | 6/1993 | Abrams et al. ......................... 493/87 X |
| 5,267,934 | 12/1993 | Pape et al. .......................... 53/133.2 X |
| 5,272,855 | 12/1993 | Togi et al. .......................... 53/133.2 X |
| 5,304,265 | 4/1994 | Keeler .................................. 156/73.1 X |
| 5,366,433 | 11/1994 | McCormick ....................... 53/133.2 X |
| 5,435,805 | 7/1995 | Owen et al. .............................. 493/87 |
| 5,484,374 | 1/1996 | Bachner et al. . |
| 5,601,669 | 2/1997 | Moody et al. ......................... 493/87 X |
| 5,653,832 | 8/1997 | Thompson et al. ................... 493/87 X |
| 5,759,143 | 6/1998 | Blain et al. ......................... 53/133.2 X |
| 5,770,009 | 6/1998 | Blain et al. ........................... 493/87 X |
| 5,819,504 | 10/1998 | Giaromelli et al. ............... 53/133.2 X |

FOREIGN PATENT DOCUMENTS

| | | |
|---|---|---|
| 0819611 | 1/1998 | European Pat. Off. . |
| 2 238 287 | 5/1991 | United Kingdom . |
| 9510408 | 4/1995 | WIPO . |

*Primary Examiner*—Daniel B. Moon
*Attorney, Agent, or Firm*—Welsh & Katz, Ltd.

[57] ABSTRACT

The present invention may be utilized as a single station integrated with a standard form, fill and seal machine wherein at least two containers are conveyed along the machine simultaneously. The present invention is able to retrieve fitments from a source, apply the fitments to the containers, and seal the fitments to the container at a single station. The design of the present invention requires only minimal space on a form, fill and seal machine. In practicing the present invention, at least two anvils retrieve fitments from a source and then undergo offset rotation into the interior of two containers. The anvils, with the fitments attached, are then moved translationally to insert the fitments through incisions in the respective containers. Once the fitments are positioned therethrough the incision, sealers permanently attach the fitments to the containers. The anvil then reverses its translational motion with one of the anvils moving a greater distance than the other anvil thereby positioning the anvils for offset rotation out of the interior of the containers. By inserting and sealing fitments to containers at a single station, the present invention is able to substantially diminish any opportunities for the fitments becoming disengaged from the containers prior to sealing of the fitments to the container. Also, the offset rotation allows for a rotating anvils to be used for multiple container processing machines.

20 Claims, 11 Drawing Sheets

OFFSET ROTARY ANVILS FOR APPLYING FITMENTS TO CARTON

BACKGROUND OF THE INVENTION

1. Field of the Invention

The present invention relates to a process and apparatus for applying fitments to a container. Specifically, the present invention relates to a process and apparatus for simultaneously applying fitments to two cartons.

2. Description of the Related Art

Forming, filling and sealing machines have been used for decades in the food packaging industry to package items such as milk for distribution to retail outlets such as grocery stores. Generally these machines are fed a paperboard sheet laminated with heat-sealable plastic which is formed to a container configuration, filled with a specific contents and then sealed for distribution elsewhere. A gabled top milk carton is a specific example of the containers formed, filled and sealed by these machines.

Previously, the contents of these containers were dispensed by tearing open one side of the top of the carton to form a pourable spout. However once open, the carton was unable to be tightly resealed to prevent spillage of the contents or the ingress or egress of gases. To alleviate these problems, the packaging industry devised a new generation of cartons integrated with fitments in order to dispense the contents in a resealable manner. This has forced the packaging industry to either design completely new forming, filling and sealing machines to accommodate the application of the fitment with the container, or design a fitment applicator as an add-on component for existing machines.

Most of the fitment applicators were designed to place the fitment in a pre-cut hole of the container at one station in the machine and then to attach the fitment to the container through ultrasound, heat or the like at another station in the machine. One clearly apparent disadvantage of such a dual station fitment applicator is the space requirement for two additional stations on an already crowded forming, filling and sealing machine. Another critical disadvantage to dual station fitment applicators is the potential for displacement of the fitment from the container during transportation from the insertion station to the attachment station. Still another critical disadvantage to dual station fitment applicators is the necessity to index the conveyance of the containers to two additional stations. Recent fitment applicators have attempted to respond to some of these disadvantages, however, there is still a need for a fitment applicator which alleviates all of the disadvantages of the dual station applicators.

Additionally, current multiple container processing packaging machines such as TETRA REX® packaging machines available from Tetra Pak, Incorporated of Chicago, Ill., have created difficulties in the use of rotating anvils such as disclosed in U.S. Pat. No. 5,484,374. Multiple container processing machines index two or more containers simultaneously along the container path from one station to the next. Current rotating anvils cannot clear the walls of adjacent containers thereby preventing the use of rotating anvils on multiple container processing machines.

BRIEF SUMMARY OF THE INVENTION

The present invention provides a fitment applicator that meets the unfulfilled needs for multiple container processing form, fill and seal machines. The present invention is able to accomplish this by providing anvils with offset rotation thereby allowing the anvil to clear the walls of adjacent containers.

One aspect of the present invention is an apparatus for applying fitments to a series of containers conveyed along a carton path with each container having an open end and an incision therein. The apparatus includes at least two anvils, fitment dispensers, sealing means and a drive source for the anvils. The anvils are disposed adjacent each other. Each anvil has a first end with a first fitment engagement means protruding therefrom and a second end with a second fitment engagment means protruding therefrom. The fitment dispensers contain fitments for engagement with the fitment engagement means. The fitment dispensers are disposed above the series of containers. The means for sealing the fitments to each of the containersare disposed below each of the corresponding fitment dispensers. The rotational drive source is connected to each of the anvils and provides for 360 degree offset rotation of each of the anvils.

Another aspect of the invention is a method for applying fitments to containers utilizing anvils capable of offset rotation.

It is a primary object of the present invention to a method and apparatus for applying fitments to a multiple container processing packaging machine utilizng anvils capable of offset rotation.

Having briefly described this invention, the above and further objects, features and advantages thereof will be recognized by those skilled in the pertinent art from the following detailed description of the invention when taken in conjunction with the accompanying drawings.

BRIEF DESCRIPTION OF SEVERAL VIEWS OF THE DRAWINGS

Several features of the present invention are further described in connection with the accompanying drawings in which:

There is illustrated in FIG. 1 a side view of one embodiment of an apparatus of the present invention.

Figure 1:
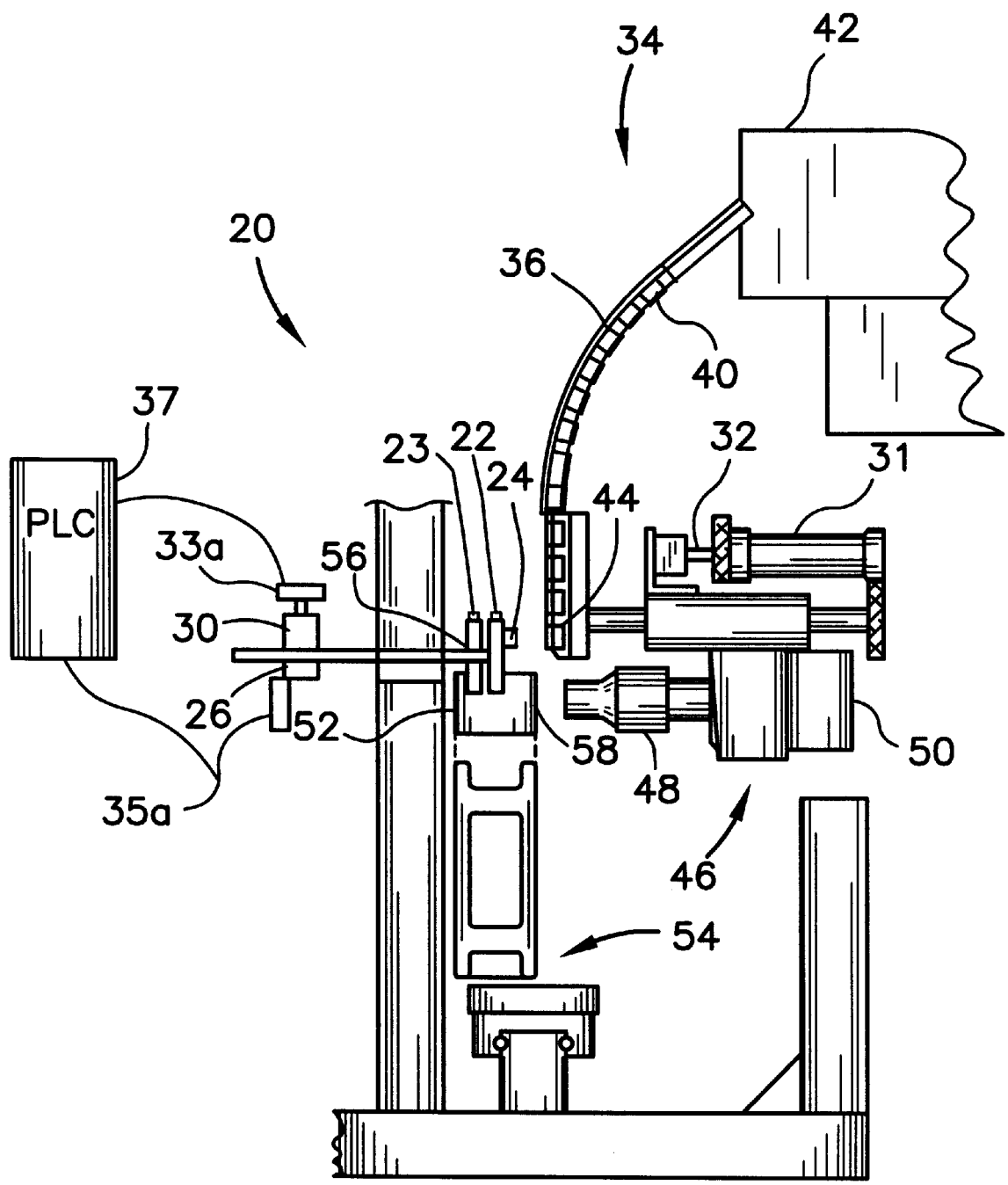
Figure 2A:
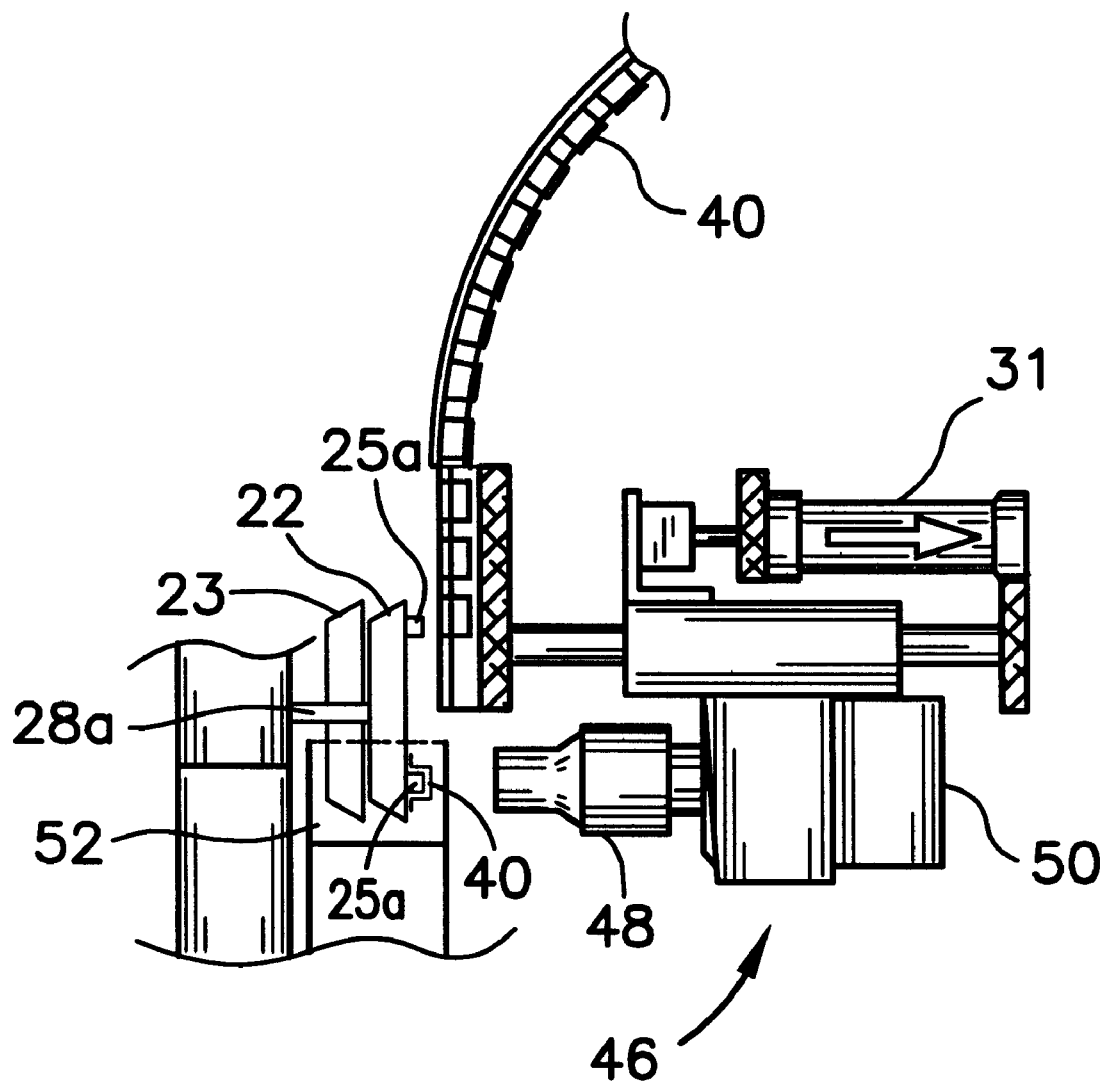

There is illustrated in FIG. 2A a side view of the apparatus of FIG. 1 at a first point in time.

Figure 2B:
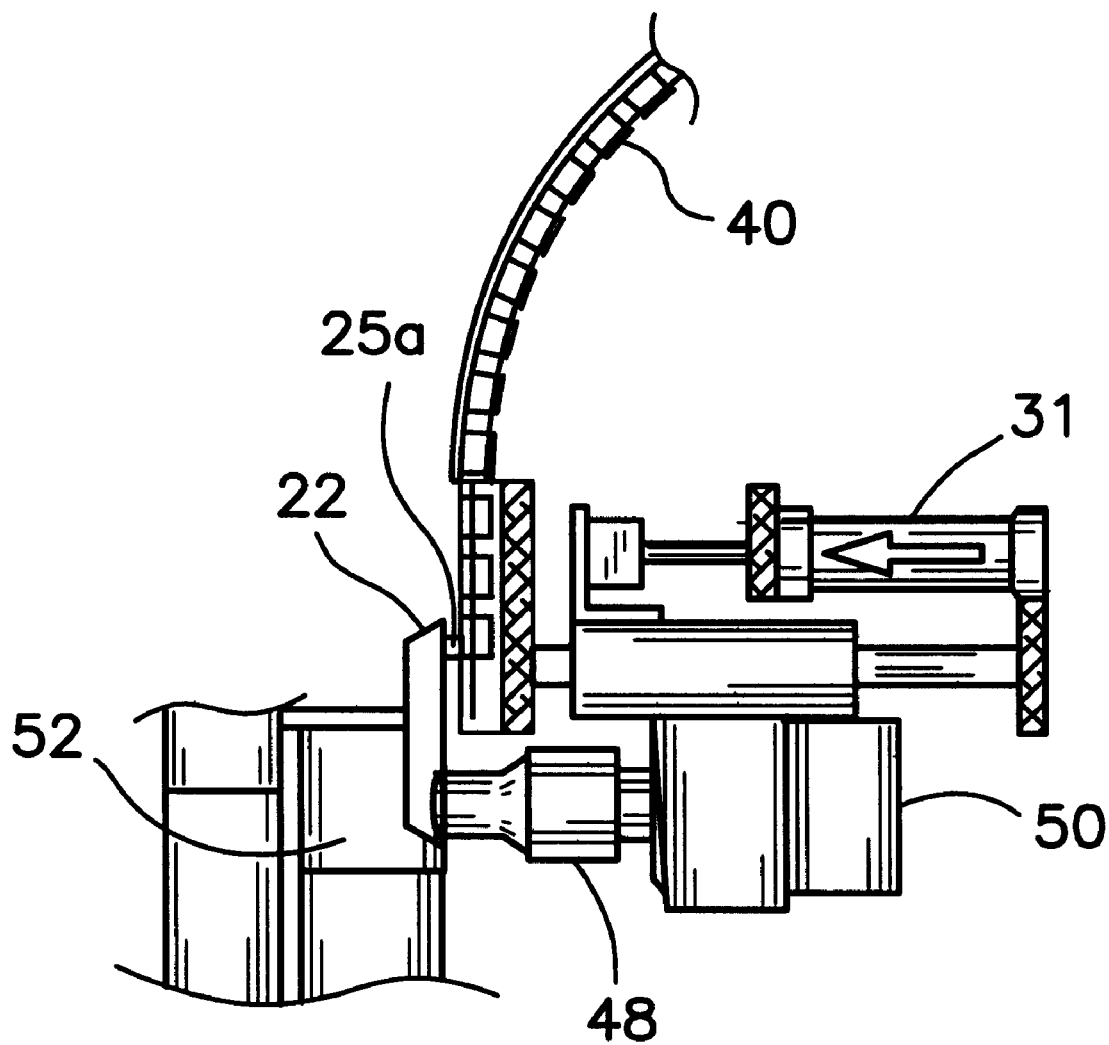

There is illustrated in FIG. 2B a side view of the apparatus of FIG. 1 at a second point in time.

Figure 2C:
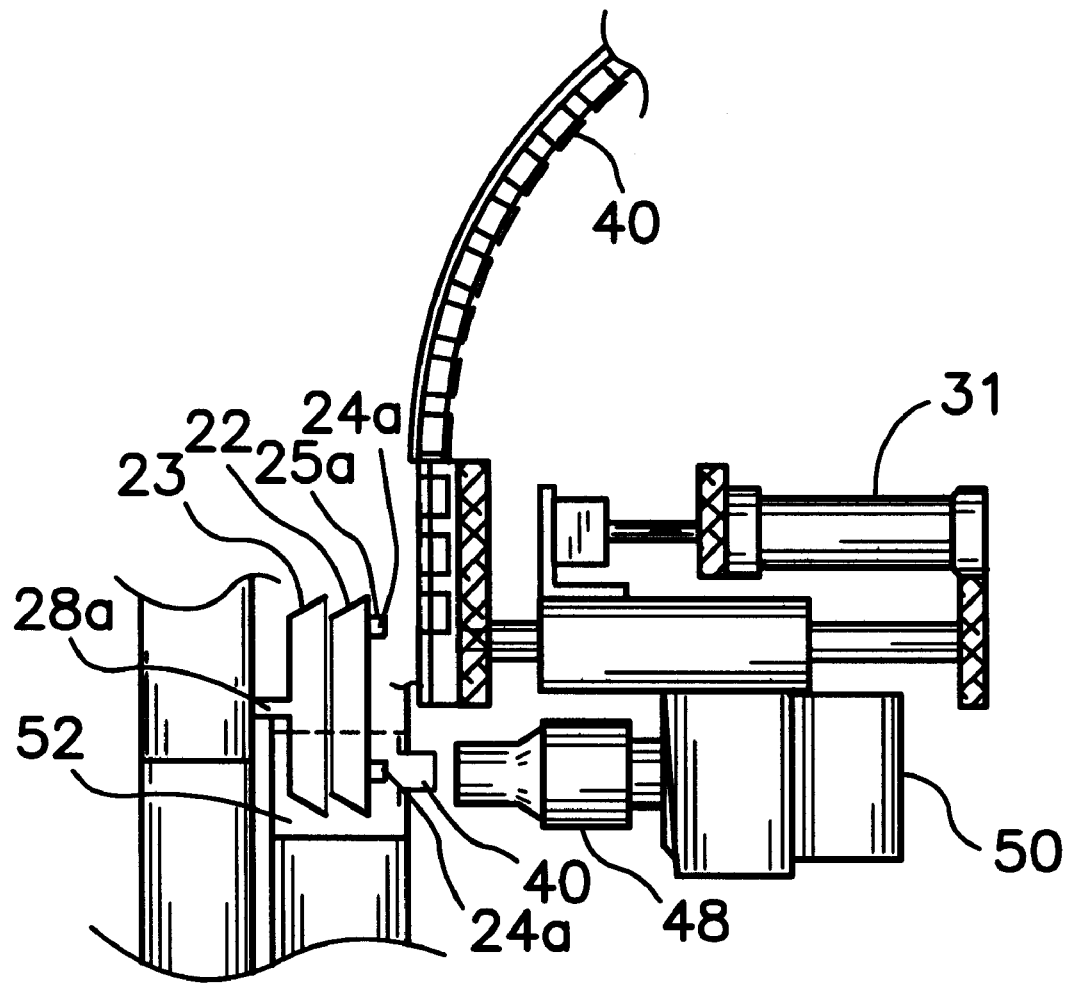

There is illustrated in FIG. 2C a side view of the apparatus of FIG. 1 at a third point in time.

Figure 2D:
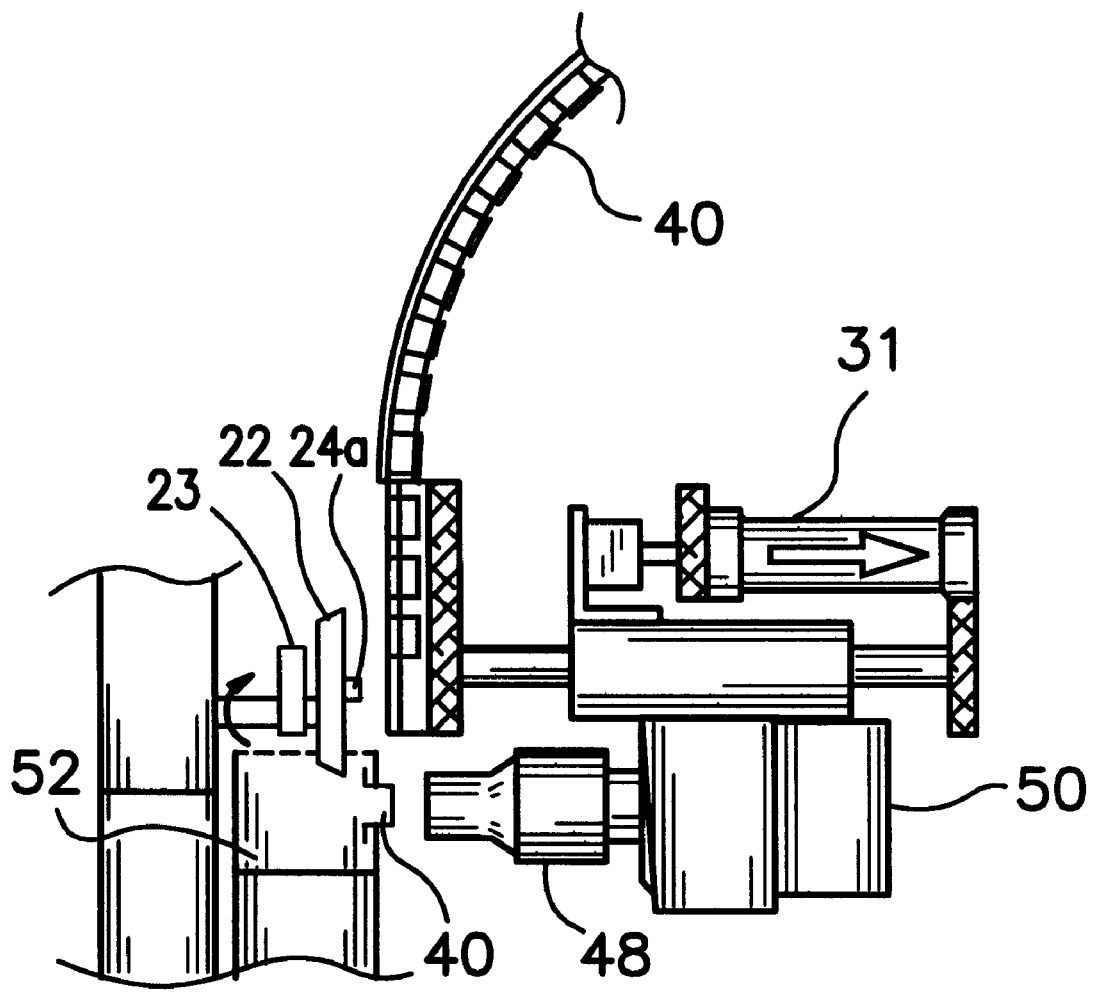

There is illustrated in FIG. 2D a side view of the apparatus of FIG. 1 at a fourth point in time.

Figure 2E:
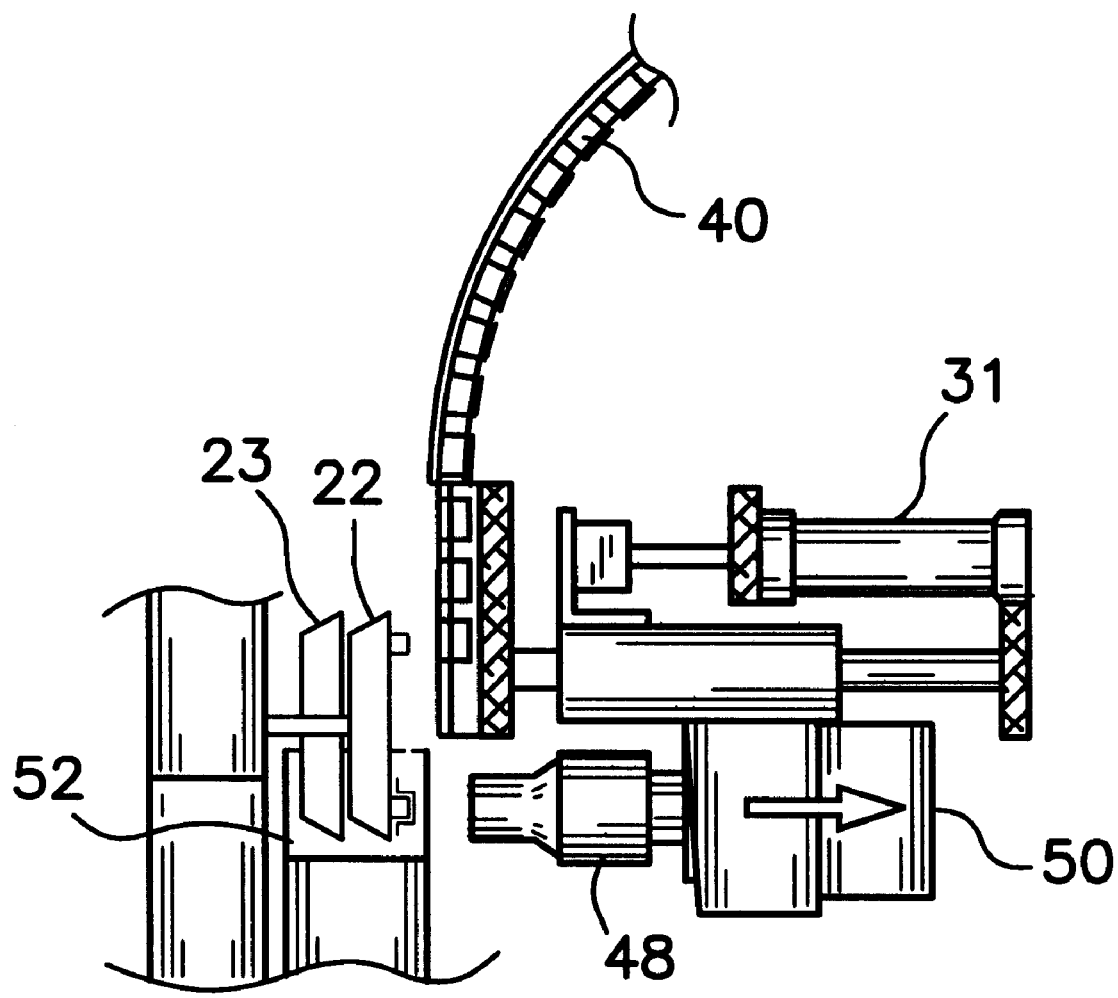

There is illustrated in FIG. 2E a side view of the apparatus of FIG. 1 at a fifth point in time.

Figure 2F:
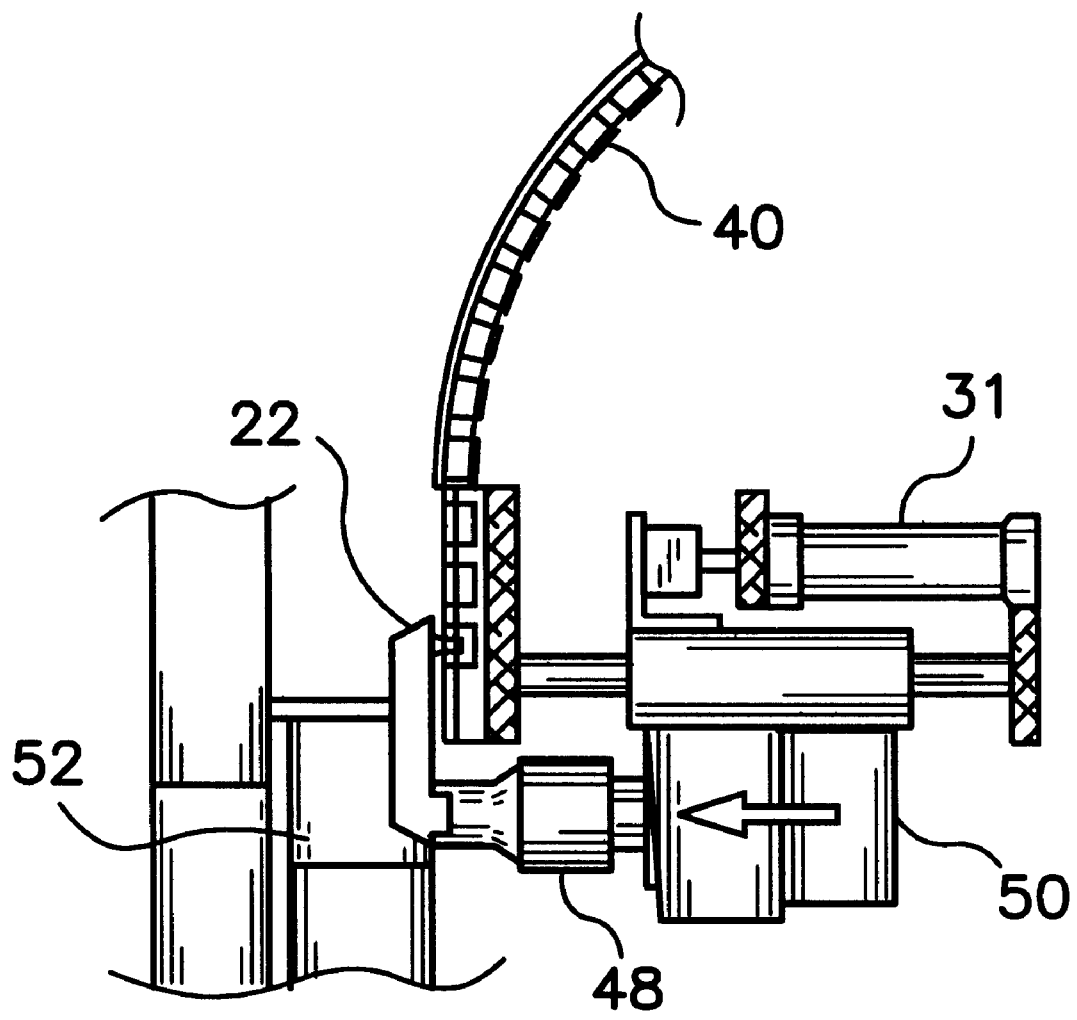

There is illustrated in FIG. 2F a side view of the apparatus of FIG. 1 at a sixth point in time.

Figure 3:
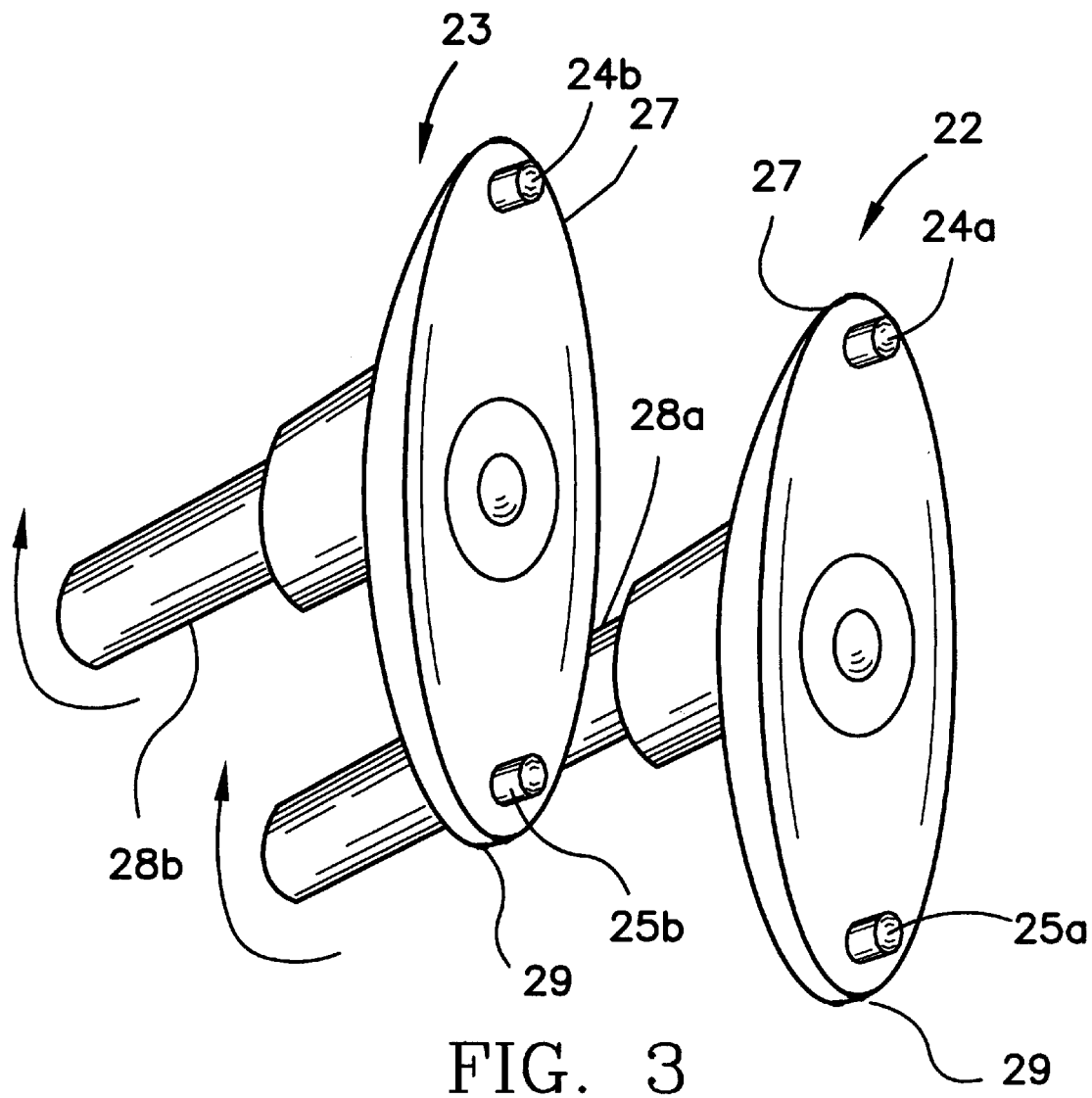

There is illustrated in FIG. 3 a front perspective view of one embodiment of the offset rotating anvils of the present invention.

Figure 4:
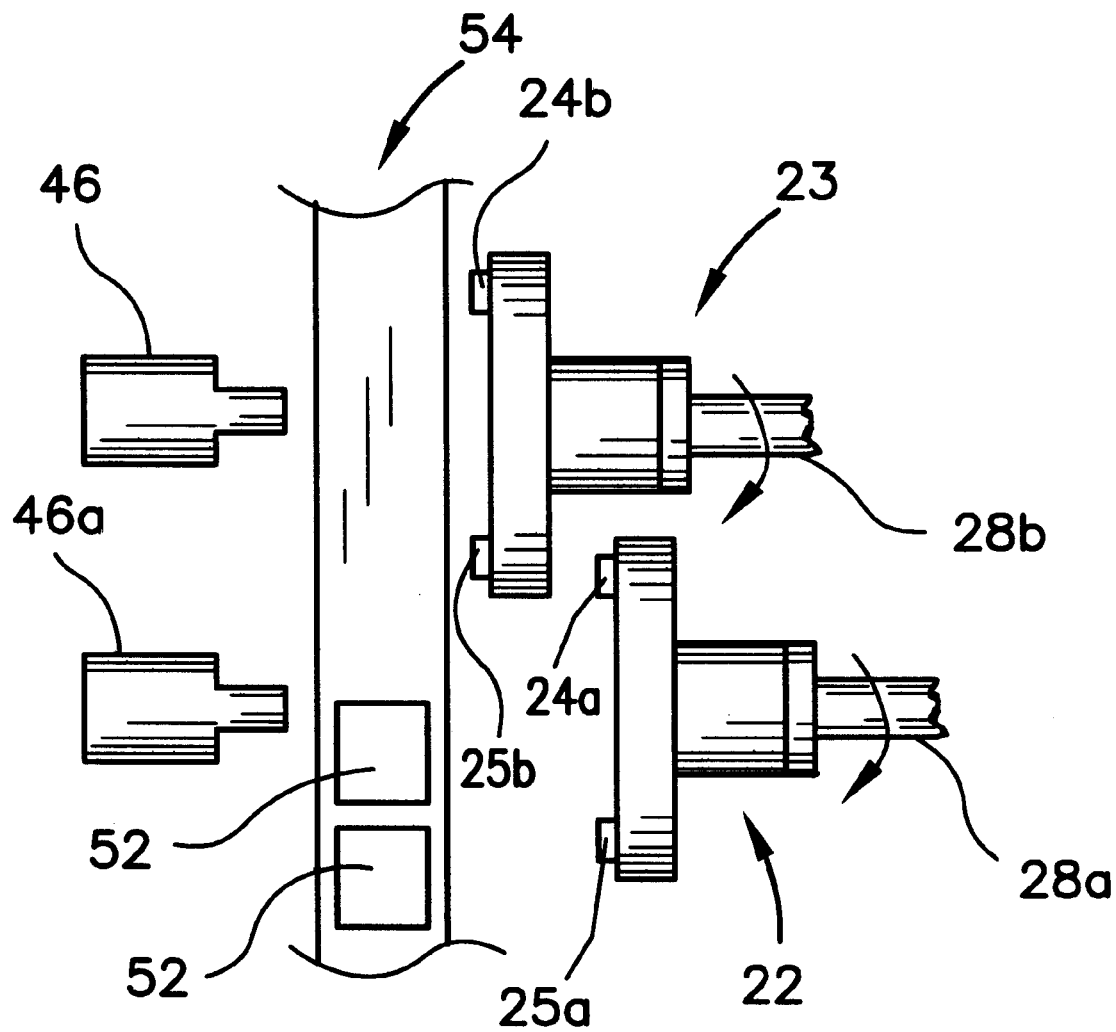

There is illustrated in FIG. 4 a top plan view of the offset rotating anvils of the present invention.

Figure 5:
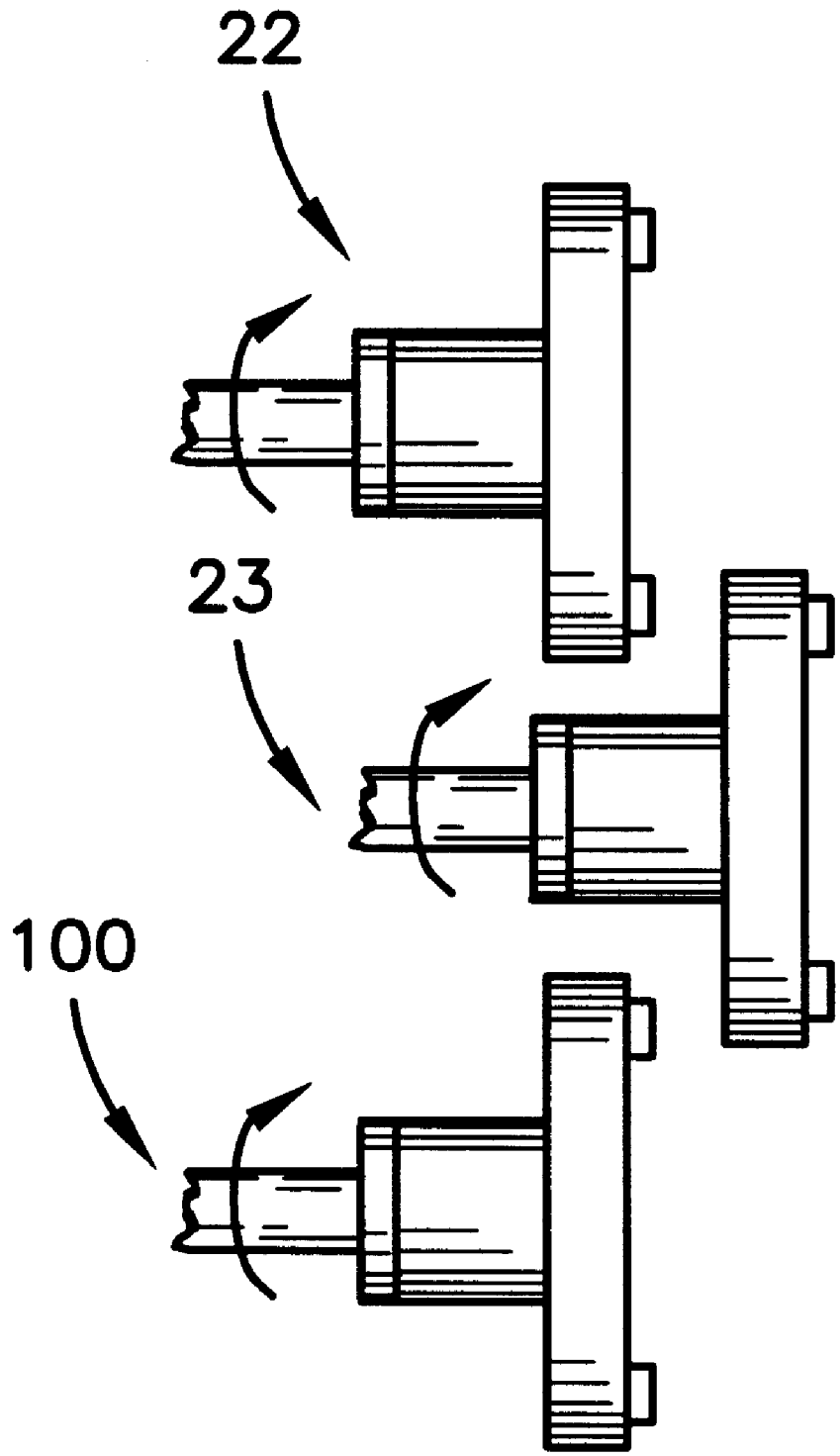

There is illustrated in FIG. 5 a top plan view of an alternative embodiment of the present invention with three offset rotating anvils.

Figure 6:
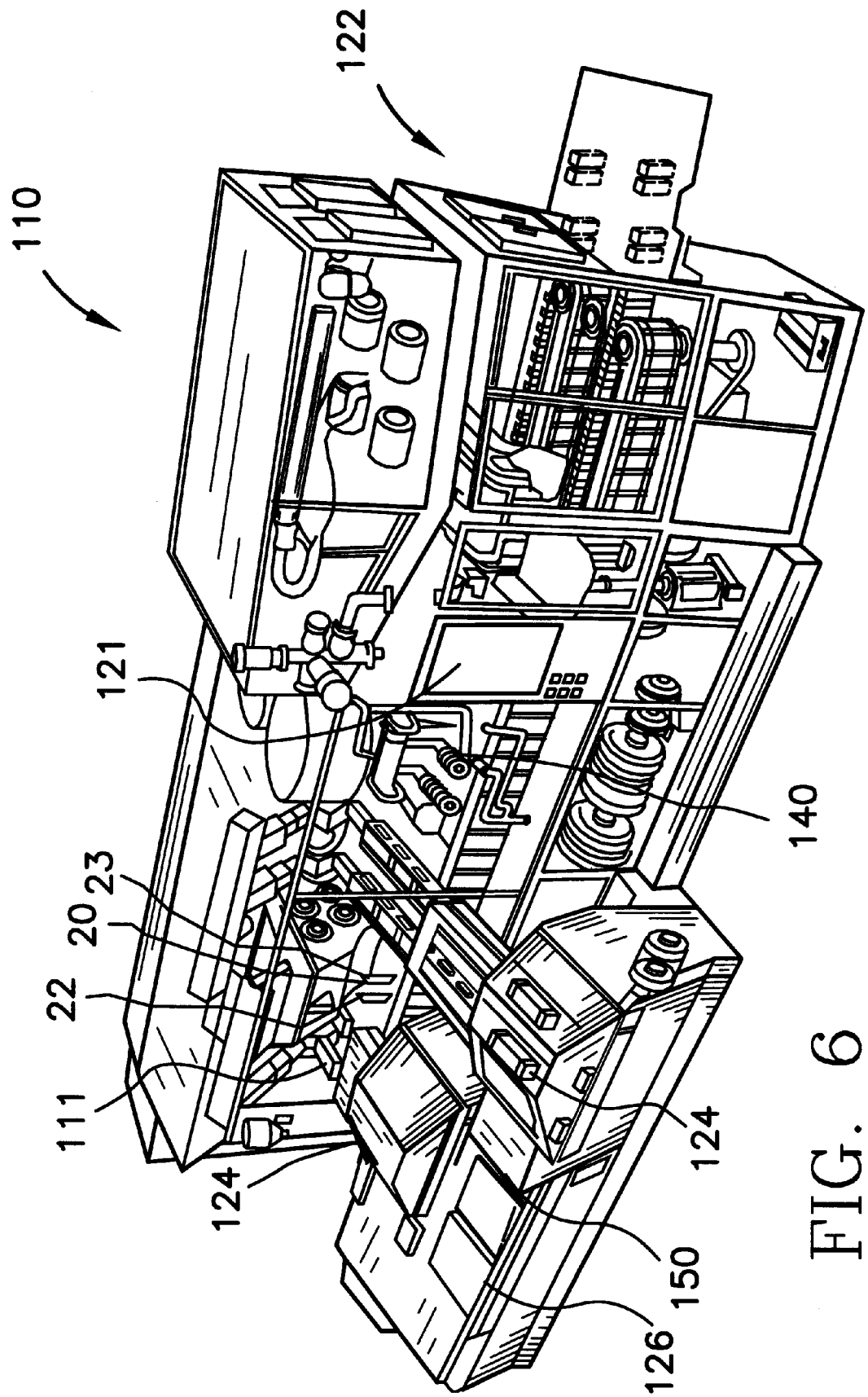

There is illustrated in FIG. 6 a perspective view of a packaging machine having the fitment applicator of the present invention thereon.

DETAILED DESCRIPTION OF THE INVENTION

The present invention is designed to be a component of a batch processing form, fill and seal packaging machine for cartons whether as an integrated component of a new machine or as an add-on component to an existing machine. However, those skilled in the pertinent art will recognize possible applications of the present invention other than those mentioned above.

In utilization with a batch processing form, fill and seal machine, the present invention is preferably positioned between the bottom forming of a container and the filling of such container on the form, fill and seal machine. The present invention has been designed to minimize both time and space in utilization with a form, fill and seal machine. To accomplish the minimization of time and space, the present invention has been designed for minimal translational movement and offset rotation of a plurality of anvils that transport fitments from corresponding fitment dispensers to containers for attachment thereon in a continual process indexed to the conveyance of containers along a conveyor belt of a form, fill and seal machine.

There is illustrated in FIG. 1 a side view of one embodiment of an apparatus of the present invention. Referring to FIG. 1, the fitment applicator of the present invention is generally designated 20. The applicator 20 has a first anvil 22 and a second anvil 23 that are both capable of translational movement and 360 degree rotation. The anvils 22 and 23 have first fitment engagement means 24a and 24b at a first end 27 and second fitment engagement means 25a and 25b at a second end 29, each of the fitment engagement means 24a–b and 25a–b protruding from one surface of each of the anvils 22 and 23. The anvils 22 and 23 are each separately connected to a rotational drive source 26a–b through shafts 28a–b. The rotational drive source 26a–b provides for the 360 degree rotational movement of the anvils 22 and 23 in two 180 degree movements. Translational movement of the anvils is accomplished by a translational drive source 30a–b that is connected to the anvils 22 and 23 through shafts 28a–b. The anvils 22 may be moved translationally from a forward position to a rearward position with one of the anvils 22 or 23 moved rearward a distance greater than the other anvil 22 or 23. The drive sources 26 and 30 may be controlled by servomotors 33 that are controlled by a programmable logic controller ("PLC") 37. The movement of the anvils 22 and 23 will more thoroughly be described in reference to FIGS. 2A–F.

Still referring to FIG. 1, fitment dispensers are generally designated 34a–b. The fitment dispensers 34a–b are composed of chutes 36a–b that transport fitments 40 from a fitments feeder 42, not shown, to one end of the chute 36 located on the first horizontal plane. Fitments 40 placed in engagement points 44a–b are positioned to be engaged by the fitment engagement means 24a–b.

Ultrasonic sealers are generally designated 46. Each of the ultrasonic sealers 46 consists of a sonotrode 48 and a converter 50. Means for sealing the fitment 40 to the container 52 may be an ultrasonic sealer 46 or other sealing devices such as a heater for chemical adhesion between the fitment 40 and the container 52, induction heating, hot melt, or the like. The ultrasonic sealer 46 is capable of linear movement toward and away from a container 52 to be attached with a fitment 40. The containers 52 are conveyed to a position below the fitment applicator 20 by a conveyor belt 54. The containers 52 are partially constructed and have an open end 56 for placement of one of the anvils 22 or 23 therethrough. The containers 52 each have an incision 58 that has been cut into the container 52 for placement of a fitment therethrough. The fitment 40 has a flanged end which is positioned against the interior walls of the container 52 while the spout of the fitment 40 protrudes through the incision 56. The ultrasonic sealer 46 is horizontally aligned with the incision 58 of the container 52 for temporary engagement of the ultrasonic sealer 46 with the fitment 40 when it is inserted through the incision 58 of the container 52 by one of the anvils 22 or 23. In a preferred embodiment, two containers 52 are conveyed simultaneously necessitating simultaneous application of fitments to both containers 52. However, three, four, . . . ten containers or any multiple of containers may be conveyed simultaneously to a fitment applicator 20 which have a corresponding number of offset anvils, fitment dispensers and sealers.

FIGS. 2A–2F illustrate a full cycle of the fitment applicator 20 of the present invention wherein the anvils each engage a fitment 40 on one lobe while inserting a fitment 40 on the other lobe through the incision 58 in the container 52. The anvils then undergo reverse translational movement with respect to the container and conveyor belt 54. Next, the anvils undergo offset rotation wherein the lobe that had just engaged a fitment 40 is now placed within a new container. The anvils undergo forward translational movement to insert the lobe with the fitment engaged thereon through the incision 58 of the new container 52.

Referring to FIG. 2A, the anvils 22 and 23 have completed a 180 degree offset rotation into a pair of containers 52. The fitment engagement means 24a–b are engaged with fitments 40 thereon. At this engagement stage, the ultrasonic sealer 46 is in its resting position. The lobe that is the fitment engagement means 24a–b couples with the cavity 45 formed by the spout and cap of the fitment 40. In this manner, the fitment 40 is firmly but not permanently attached to the fitment engagement means 24a–b that allows for the transport of the fitment 40 from the fitment dispenser 34 to the container 52. The anvil 23 is still offset from anvil 22 during this stage of the cycle. The fitment engagement means 25a–b are each prepared to engage a new fitment 40 from fitment dispenser 34. The ultrasonic sealer 46 rests at a sufficient distance from the fitment 40 which allows for the fitment 40 to protrude from the container 52 after insertion into the incision 58. The flange of the fitment 40 will rest firmly against the wall of the container 52. If the ultrasonic sealer 46 is too close to the fitment 40, then the fitment 40 may become dislodged prior to complete insertion into the incision 58.

Referring to FIG. 2B, the anvils 22 and 23 have undergone forward translational movement from the anvils 22 and 23 respective positions shown in FIG.2A. The forward translational movement is in relation to the conveyor 54 and container 52 thereon. The fitment engagement means 25a is engaging a new fitment 40 disposed within the fitment dispenser 34a. Similarly, however not shown, the fitment engagement means 25b is engaging a new fitment 40 disposed within the fitment dispenser 34b. The fitment engagement means 24a and 24b have inserted respective fitments 40 attached thereon through the incisions 58 of the respective containers 52. Opposite of the fitment engagement means 24a–b are the sonotrodes 48 of the sealing devices 46 that have encompassed the fitments 40. The flange of the fitments rests on the interior of the container 52. During ultrasonic sealing, the sonotrode 48 transfers ultrasonic energy to the container and flange thereby welding the flange to the container 52. Once at the activation position, the ultrasonic sealers 46 generate an ultrasonic sound which vibrates for a predetermined time and at a frequency sufficient to weld the flange of the fitments 40 to the interior of the wall of each of the containers 52. The flange of the fitments 40 is buttressed by the anvils 22 and 23 which has sufficient inertia to allow for the proper welding of the flange of each of the fitments 40 to the wall of the containers 52. If the anvils 22 and 23 do not possess sufficient inertia, then the fitments 40 might not be completely welded to the containers 52, or the cap might be welded to the spout of each of the fitments 40. Once each of the fitments 40 is properly welded to each of the containers 52, the anvils 22 and 23 are ready for retraction from the attachment position.

Referring to FIG. 2C, the anvils 22 and 23 have undergone reverse translational movement in relation to the conveyor 54 and the containers 52. The anvil 23 has moved a greater distance than the anvil 22 in order to permit the offset rotation of the anvils 22 and 23. The fitments 40 are engaged on the containers 52 and the ultrasonic sealers 46 have also undergone reverse translation movement in relation to the convyeor 54 and containers 52, however, the movement is in the opposite direction from the movement of the anvils 22 and 23. The fitment engagement means 24a–b are without fitments 40 since the fitments 40 that had been on fitment engagement means 24a–b are now on the containers 52. The fitment engagment means 25a–b have fitments 40 engaged thereon for placement on new containers 52. The translational movement of each of the anvils 22 and 23 is controlled by a second drive source 30 that is connected to the anvils via the respective shafts 28a–b. The drive source 30 may be connected to both shafts 28a–b or each shaft may have its own drive source 30. The translational movement of the ultrasonic sealer 46 is controlled by a sealer drive source 31. Similar to the anvils 22 and 23, the time and space saving features of the present invention are apparent from the minimal distance that the ultrasonic sealer 46 travels from a resting position to an activation position.

Referring to FIG. 2D, the anvils 22 and 23 are mid-way through offset rotation wherein the fitment engagement means 24a–b of the anvils 22 and 23 are rotated out of the old containers 52 (containers that now have a fitment attached thereon) and fitment engagement means 25a–b of the anvils 22 and 23 are rotated into new containers 52 (containers in need of a fitment). The offset rotation of the anvils 22 and 23 is indexed to the conveyance of containers 52 on the conveyor 54. Once the anvils 22 and 23 are rotated from the interior of the containers 52, the containers 52 are conveyed down the line to another station on the form, fill and seal machine. Subsequent containers 52 will then assume the newly vacated positions at the applicator 20. The timing of the applicator cycle and the indexed movement of containers 52 may be controlled by the PLC 37 through servo amplifiers and servomotors. Such a control means is disclosed in U.S. Pat. No. 5,706,627 for a Control System For A Packaging Machine which is hereby incorporated by reference in its entirety, and which has the same assignee as the present application.

Referring to FIG. 2E, the position of the anvils 22 and 23 is very similar to that of FIG. 2A except that now fitment engagement means 25a–b are within containers 52 while the fitment engagement means 24a–b are lying on a horizontal plane with each of the fitment dispensers 34, prepared to retrieve a fitment 40 therefrom. Again, anvil 23 is offset from anvil 22.

Referring to FIG. 2F, the position of the anvils 22 and 23 is very similar to that of FIG. 2A except that now fitment engagement means 25a–b are inserted through each of the incisions 58 of each of the containers 52 to position fitments 40 thereon while the fitment engagement means 24a–b are engaged with each of the fitment dispensers 34 to engage new fitments 40 thereon. The anvils are then retracted to the offset positions for rotation out of the interior of the containers 52. The process is then repeated for a new set of containers 52 that are transported along the conveyor belt 54 to the applicator 20.

As shown in FIG. 3, the offset rotating anvils 22 and 23 may have lobes 24 and 25 as the fitment engagement means. Alternatively, a vacuum engagement means may be utilized to engage fitments 40. The fitment engagement means 24a–b and 25a–b are positioned to take full advantage of the rotation of the anvils 22 and 23, and the placment of the anvils within the interior of containers 52. The distance between anvils 22 and 23 and the distance between fitment engagement means 24 and 25 on each of the anvils 22 and 23 correspond to a particle container corss-section and volume. Hence, anvils for containers 52 having a cross section of 70 mm×70 mm and a one liter volume would have differences in placement of the fitment engagement means 24 and 25 and the distance between anvils 22 and 23 than for containers having a cross-section of 95 mm×70 mm and a one liter volume. The distance the shafts 28a–b translationally move may also be different for different containers 52.

Referring to FIG. 4, the offset rotation of the anvils 22 and 23 at a mid-way point is shown to illustrate the positioning of the anvils 22 and 23 and shafts 28a–b to each other. The ultrasonic sealers 46 and 46a are positioned across the conveyor 54 which has containers 52 traveling thereon.

An alternative embodiment of the present invention is shown in FIG. 5. In FIG. 5, an additional anvil 100 is provided and shown in offset rotation with anvils 22 and 23. Those skilled in the art should recognize that the number of anvils may be increased with each anvil offset from an adjacent anvil. Those batch processing of containers 52 may be accomplished on an applicator 20 to increase the production time of a packaging machine. For example, six anvils may be placed on an applicator 20 for simultaneously attaching fitments 40 to six containers 52.

Referring to FIG. 6, a packaging system 110 including a packaging machine 122 is shown with an applicator 20 disposed thereon. The applicator 20 is positioned subsequent to a bottom forming station 111 and prior to a filling station 140. The packaging system may include a magazine 126 with carton opener 124.

From the foregoing it is believed that those skilled in the pertinent art will recognize the meritorious advancement of this invention and will readily understand that while the present invention has been described in association with a preferred embodiment thereof, and other embodiments illustrated in the accompanying drawings, numerous changes, modifications and substitutions of equivalents may be made therein without departing from the spirit and scope of this invention which is intended to be unlimited by the foregoing except as may appear in the following appended claims. Therefore, the embodiments of the invention in which an exclusive property or privilege is claimed are defined in the following appended claims:

I claim as my invention:

1. A method for applying fitments to a series of containers conveyed along a container path, each container having an open end and an incision therein, the method comprising:

moving at least two anvils to engage fitments to a first fitment engagement means of each of the anvils;

moving each of the anvils in an opposite direction with the movement of one of the at least two anvils being moved a greater distance than the other for offset rotation thereof;

rotating the anvils offset to each other, each anvil having a fitment engaged thereon, the anvils rotated into adjacent containers through the open end until the fitments are aligned with the incision of each of the adjacent containers;

moving the anvils translational to the carton path until the fitments are inserted through the incision of each of the containers; and affixing the fitments to the containers before substantial disengagement of the fitments from each of the anvils.

2. The method for applying fitments to a series of containers according to claim 1 further comprising engaging fitments to a second fitment engagement means of each of the anvils simultaneous with affixing the fitments to the containers.

3. The method for applying fitments to a series of containers according to claim 1 further comprising the step of reversing the movement of the anvils subsequent to affixing the fitments to the containers.

4. The method for applying fitments to a series of containers according to claim 1 wherein affixing the fitments to the containers is accomplished by ultrasonically welding the fitments to the containers.

5. The method for applying fitments to a series of containers according to claim 1 wherein affixing the fitments to the containers is accomplished by heat sealing the fitments to the containers.

6. The method for applying fitments to a series of containers according to claim 1 further comprising a third anvil wherein moving the anvils in an opposite direction includes moving a center anvil of the three anvils a greater distance than the other two anvils for offset rotation of the anvils.

7. The method for applying fitments to a series of containers according to claim 1 wherein affixing the fitments to the containers is accomplished by chemical adhesion of the fitments to the containers.

8. The method for applying fitments to a series of containers according to claim 1 wherein each of the anvils has a first end with a first fitment engagement means and a second end with a second fitment engagement means whereby during translational movement of each of the anvils, one end of each of the anvils is positioned within a container.

9. The method for applying fitments to a series of containers according to claim 8 wherein the rotation of the anvils is indexed to the conveyance of the containers along the carton path.

10. An apparatus for applying fitments to a series of containers conveyed along a carton path, each container having an open end and an incision therein, the apparatus comprising:

at least two anvils disposed adjacent each other, each anvil having a first end with a first fitment engagement means protruding therefrom and a second end with a second fitment engagement means protruding therefrom;

at least two fitment dispensers containing a plurality of fitments for engagement with the fitment engagement means, the fitment dispensers disposed above the series of containers;

at least two means for sealing the fitments to each of the containers, each of the sealing means disposed below each of the corresponding fitment dispensers; and a rotational drive source connected to each of the anvils, the rotational drive source providing for 360 degree offset rotation of each of the anvils;

a translational movement drive source connected to each of the anvils, the translational movement drive source providing for translational movement of each of the anvils relative to the carton path and providing for the translational movement of at least one of the anvils a distance greater than the other anvil to allow for offset rotation thereof.

11. The apparatus according to claim 10 wherein the sealing means are ultrasonic welding devices.

12. The apparatus according to claim 10 wherein each of the fitment engagement means is a lobe which engages the fitment for transport from the fitment dispenser to insertion into the incision of each of the containers.

13. The apparatus according to claim 10 wherein the drive sources are connected to each of the anvils by a shaft disposed centrally between the first and second ends of each of the anvils.

14. The apparatus according to claim 13 further comprising a third anvil disposed adjacent one of the other anvils wherein translationally moving the anvils includes moving a center anvil of the three anvils a greater distance than the other two anvils for offset rotation of the anvils.

15. The apparatus according to claim 10 wherein the sealing means are heaters for heat sealing the fitments to the containers.

16. The apparatus according to claim 13 wherein each of the shafts rotate about an axis perpendicular to the container path and each shaft is positioned whereby when one end of each of the anvils is within a container with the fitment engagement means opposite the incision, the other fitment engagement means is opposite the fitment dispenser.

17. The apparatus according to claim 10 wherein the containers are conveyed in two containers movements and each of the anvils are capable of rotating within each corresponding container simultaneously.

18. The apparatus according to claim 10 wherein each of the fitment dispensers is a chute terminating on one end and at a fitments feeder on an opposite end.

19. The apparatus according to claim 10 wherein the rotation of the anvils is indexed to the conveyance of the containers along the carton path.

20. An apparatus for applying fitments to a series of containers being conveyed along a container path, each of the containers having an open end, the apparatus comprising:

a first anvil having a first end with a first lobe and a second end with a second lobe, the first anvil disposed above the container path;

a second anvil anvil having a first end with a first lobe and a second end with a second lobe, the second anvil disposed above the container path and parallel to the first anvil;

a rotational drive source for each of the anvils allowing for 360 degree offset rotation of each of the anvils about an axis perpendicular to the container path;

a translational movement drive source for each of the anvils allowing for translational movement of each of the anvils relative to the container path, one of the first and second anvils translationally moving a distance greater than the other thereby allowing for offset rotation of the anvils in and out of the series of containers;

first and second ultrasonic sealing devices for welding fitments to the containers.

* * * * *